United States Patent [19]

Saito

[11] Patent Number: 4,737,871
[45] Date of Patent: Apr. 12, 1988

[54] MECHANISM TAKING A CARTRIDGE ON AND OFF A MICROFLOPPY DISK DRIVE

[75] Inventor: Asao Saito, Tokorozawa, Japan

[73] Assignee: Citizen Watch Co., Ltd., Tokyo, Japan

[21] Appl. No.: 841,547

[22] Filed: Mar. 20, 1986

[30] Foreign Application Priority Data

Mar. 25, 1985 [JP] Japan .................................. 60-60111

[51] Int. Cl.$^4$ ............................................ G11B 17/04
[52] U.S. Cl. ......................................... 360/99; 360/97
[58] Field of Search ..................................... 360/97, 99

[56] References Cited

U.S. PATENT DOCUMENTS

| 4,546,397 | 10/1985 | Asami et al. | 360/99 |
| 4,587,585 | 5/1986 | Shimaoka et al. | 360/97 |
| 4,636,892 | 1/1987 | Friehauf et al. | 360/97 |
| 4,641,212 | 2/1987 | Yokota et al. | 360/99 |

Primary Examiner—Robert S. Tupper
Attorney, Agent, or Firm—Koda and Androlia

[57] ABSTRACT

A cartridge loading/unloading mechanism for a microfloppy disk drive including a carrier to charge or discharge a floppy disk cartridge and a front panel to support the carrier movable upwardly and downwardly between an unloaded position and a loaded position. The front panel is utilized not only to form the opening for charging or discharging the cartridge but also to support the carrier to be movable upward and downward between the unloaded and loaded position by means of grooves on the opening formed on the sleeve portion thereof. Further, the front panel has a pair of elastic engaging clicks which engage with stoppers provided on the frame so as to realize one-touch engagement of the carrier with the frame by only pushing down the carrier.

1 Claim, 7 Drawing Sheets

MECHANISM TAKING A CARTRIDGE ON AND OFF A MICROFLOPPY DISK DRIVE

BACKGROUND OF THE INVENTION

1. Field of the Invention

The present invention relates to a cartridge loading-/unloading mechanism for a microfloppy disc drive cartridge, and more particularly to an improvement of a mechanism wherein a carrier detachably containing the cartridge therein moves upward and downward between an unloading position and a loading position.

2. Description of the Prior Art

The floppy disk has been widely used as an external memory means for computers. Especially, in recent years, a small sized floppy disk medium with a 3.5 inch diameter contained in a cartridge have become popular since it is handy to carry around and is not subject to damage.

The microfloppy disk mentioned above is read and written upon by an exclusive floppy disk drive. Accordingly, the disk drive itself should be designed to be small in size and light in weight. Specifically, in recent years, portable and battery operated computers have been popular and the disk drive for them must be designed to be more simple and small in size.

In the microfloppy disk drive cartridge loading mechanism in the prior art device, the carrier detachably containing the cartridge therein moves up and down between the unloading position and the loaded position. The cartridge can be inserted when the carrier moves to the up position, and the carrier with the cartridge is placed in the loaded position when it moves downward to a predetermined position. On the other hand, the cartridge can be ejected by reversing the above described action.

In the prior art devices a guide mechanism firmly fastened to a frame by screws or other fixing means is provided therein to support the carrier to move upward and downward, which increases not only the assembling processes and manufacturing costs, but also makes the mechanism larger.

SUMMARY OF THE INVENTION

Accordingly, it is an object of the present invention to provide a microfloppy disk drive cartridge loading mechanism which has a simple carrier guide and is remarkably decreased in its assembling processes.

In keeping with the principles of the present invention, the object is accomplished with a microfloppy disk drive cartridge loading mechansim which effectively uses a front panel as the carrier guide, which is simply a covering panel of the opening through which the cartridge is loaded and ejected, and specifcally uses two sleeves as part of the carrier guide. In order to have the two sleeves of the front panel perform as the carrier guide there are provided guide slits which firmly support the carrier to move upwardly and downwardly.

Furthermore and in accordance with the teachings of the present invention, the front panel has elastic engaging clicks by which it can be coupled with the frame in the vicinity of the guide slit which allows the assembly of the front panel to the frame to be extremely easy and further enables the immediate assembly of the frame, the carrier and the front panel.

The elastic engaging clicks mentioned above are efficient for easily dismantling the mechanism as well as normal assembly without using screws or other fastening means.

DETAILED DESCRIPTION OF THE EMBODIMENT

Figure 2:
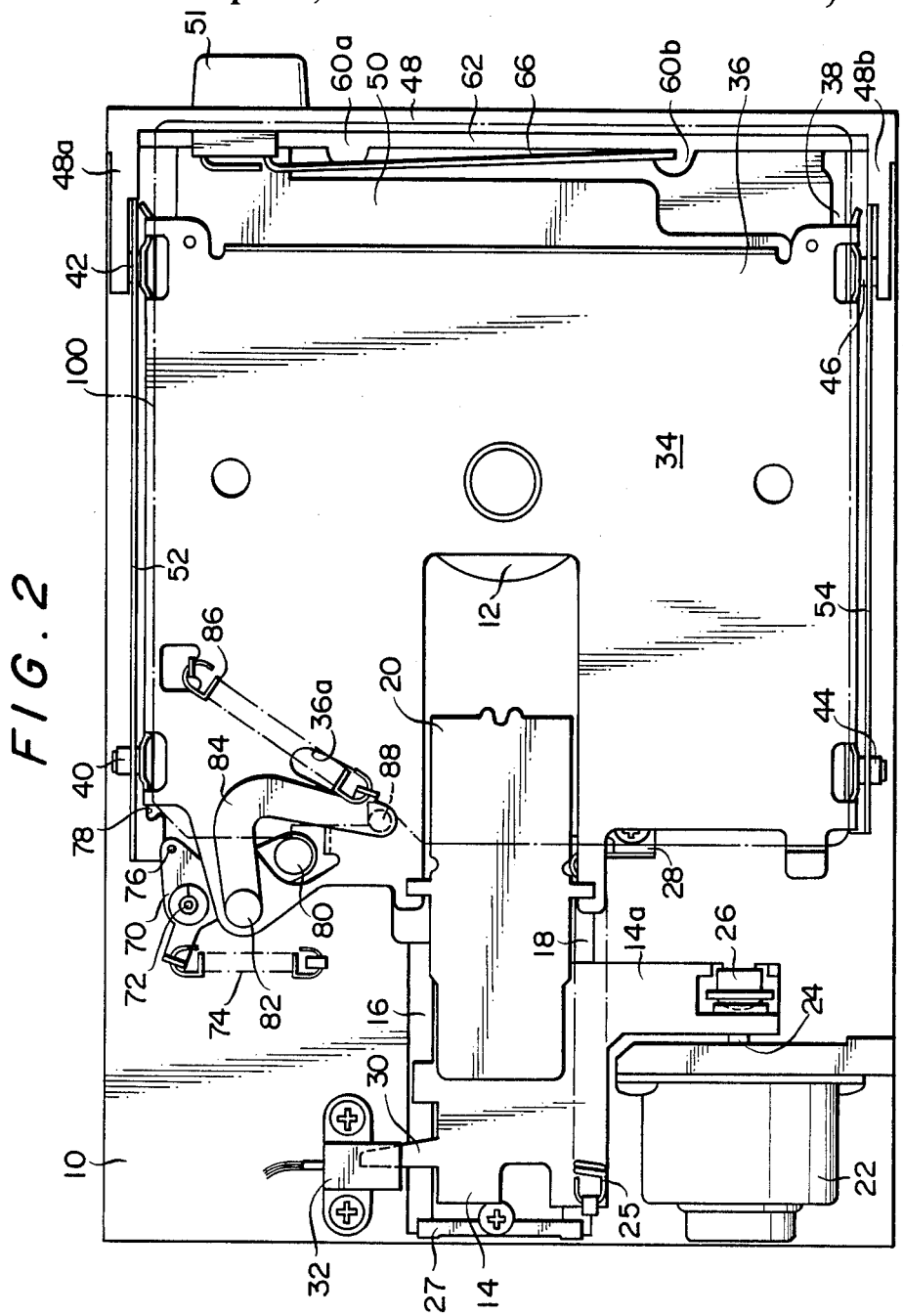
FIG. 2 is a top view showing a total composition of a floppy disk drive which the cartridge loading/unloading mechanism is built in accordance with the teachings of the present invention, the circuit board being not illustrated.

FIG. 2 is a top view showing a total composition of a floppy disk drive with a cartridge loading/unloading mechanism built in accordance with the teachings of the present invention, the circuit board not being illustrated.

A frame 10 includes a motor, not illustrated, which rotates a floppy disk at a predetermined speed, and in FIG. 2 shown therein is a chucking plate 12 which is fixed to a shaft of the driving motor, not illustrated. The center hub of the microfloppy disk is attached on a predetermined place of the chucking plate 12.

FIG. 2 shows the cartridge loaded state. The cartridge itself is illustrated by chained line 100, and the front panel is shown closed.

In order to move a read/write head over the medium in the cartridge 100 along the diameter direction of the medium, a carriage 14 is slidingly supported by guide rails 16 and 18 on the frame 10, and an arm 20 is rotatingly and pivotally supported on the carriage 14.

On the above mentioned carriage 14 and the arm 20 fixed thereon are upper and lower heads or a pad, not illustrated in detail, which performs the read/write operation from/to both sides or either one of the sides of the medium contained in the cartridge 100.

In order to move the carriage 14 to the predetermined track in the diameter direction of the medium (the right and left direction in FIG. 2), a stepping motor 22 is attached on the frame 10. A shaft 24 of this stepping motor 22 is formed so that it can be moved in and out along the direction of the shaft axis in accordance with the rotation of the rotor in the motor 22. Since the shaft 24 engages with a connecting arm 14a of the carriage 14 at its top end by way of an aligning device 26, it is understood that the in and out movement of the shaft in accordance with the rotation of the stepping motor 22 moves the carriage 14 and the arm 20 to the predetermined track.

In order to delete backlash or chatter in the stepping motor 22 and aligning device 26 a preload spring 25 is connected between the carriage 14 and the frame 10 to provide a constant preload to the carriage 14 in the right direction.

The guide rails 16 and 18 are supported at their end sections to the frame 10 to guide the carriage 14. In the Figure, both of the guide rails 16 and 18 are supported by a rail holder 27 which fixes the guide rails 16 and 18 together on their rear side. Also, the front side of the guide rails 16 and 18 are fixed in the same way, but this is not illustrated in detail. A rail holder 28 on the front side serves as a hook for the preload spring 25 on the side of the frame 10. Furthermore, a track detecting portion 30 laterally projected from the carriage 14 works with a track detector 32 composed of a photointerruptor or the like which is fixed on the frame 10 to detect a 00 position of both or either one of the heads.

In order to position the cartridge 100 at a predetermined position and take the cartridge 100 on and off at the loaded position and the unloading position, a carrier 34 is provided to receive the cartridge 100 which can be moved upwardly and downwardly. The carrier 34 consists of a carrier frame which is composed of an upper carrier plate 36 and lower guides 38 which are folded downwardly in parallel on both sides of the upper carrier plate 36 to receive the cartridge 100 therebetween. The carrier 34 has pairs of rollers 40/42 and 44/46 on both sides whereby the carrier 34 is supported by these rollers 40 and 46 at the predetermined positions so that the carrier 34 can move upwardly and downwardly.

In the embodiment a front panel is utilized to guide the carrier 34 to move upwardly and downwardly. Furthermore, a switching means is provided to switch the upward or downward motion of the carrier 34 to the unloading or loaded position. In the embodiment a slide plate 50 is used as the switch means to be arranged in the right and left directions between the carrier 34 and the frame 10. In the Figure, a cartridge ejection button 51 is fixed on the front side of the slide plate 50 to control the sliding action of the slide plate 50.

The slide plate 50 is provided with side walls 52 and 54 on both its sides. As evident from the side view of FIG. 1, on the side wall 54 (52) guide slots are provided to guide the respective rollers 40 through 46 of the carrier 34.

Figure 3:
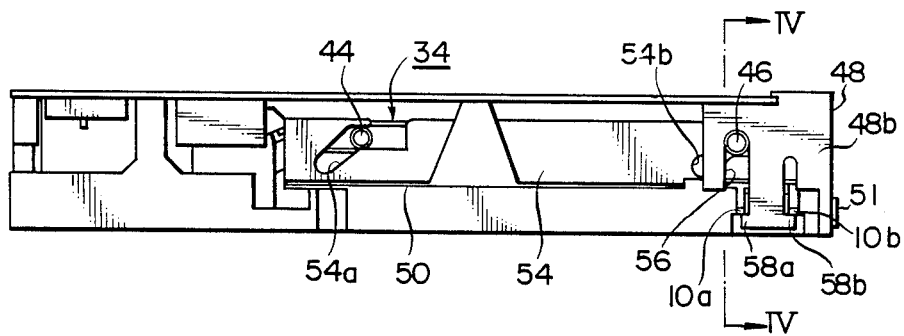
FIG. 3 is a side view showing a non-loaded state that the cartridge is ejected in FIG. 2.

FIG. 3 shows the state that the cartridge 100 is ejected from the carrier 34. As evident from FIGS. 1 and 3, the movement of the slide plate 50 enables the carrier 34 to be moved upwardly or downwardly along the slopes of the guide slots 54a and 54b, and it is understood in the embodiment that the upward and downward motion of the carrier 34 is supported by the front panel 48.

Figure 1:
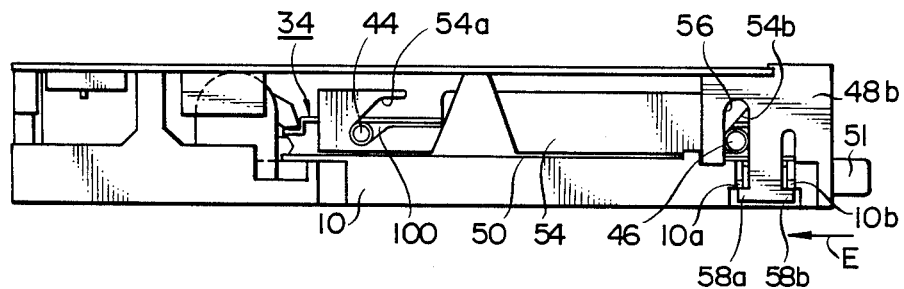
FIG. 1 shows a principal view or more particularly a side view of a microfloppy disk drive cartridge loading-/unloading mechanism in accordance with the teachings of the present invention.
Figure 4:
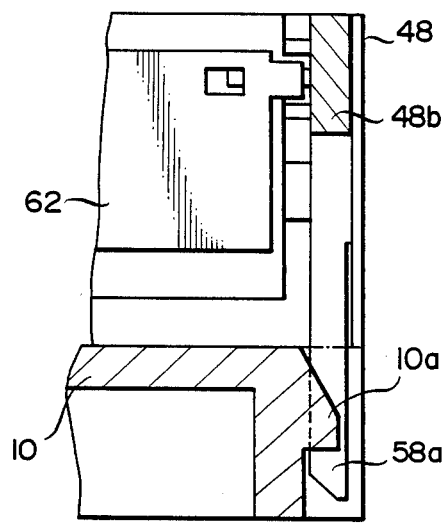
FIG. 4 is a grossly enlarged sectional view taken on line IV—IV of FIG. 3 showing the state that a front panel is assembled to the frame.

FIGS. 1 and 4 show a simple carrier supporting means to be movable up and down by means of the front panel 48 in accordance with the teachings of the present invention. The front panel 48 itself not only forms a front covering panel but also contains a lid mechanism of the opening to insert the cartridge 100 through and further forms a supporting portion for upward and downward movement of the carrier 34. Furthermore, the present invention is characterized in that the front panel 48 can be assembled with extreme ease.

As evident from FIGS. 1 and 2, the front panel 48 includes sleeves 48a and 48b on both its sides, wherein a guide slit 56 is provided. Accordingly, when insertion of the cartridge 100 releases a lock lever, which will be described hereinafter, and the slide plate 50 is urged to move to the right in the Figures by the spring, not illustrated, the carrier 34 moves horizontally in the vertical direction with the support of the guide slit 56 to reach the loaded position. On the other hand, when the cartridge ejection button 51 is pushed to move the slide plate 50 to the left in the reverse from the loading state, the carrier 34 moves upwardly with the support of the roller 46 by the guide slit 56 to return to the unloading state.

Therefore, according to the present invention, it becomes possible to simply guide the carrier 34 by the single front panel 48 without having any specific guide mechanism added to move the carrier 34 up and down.

Elastic engaging clicks 58a and 58b, as are shown in FIGS. 3 and 4, are provided on the sleeves 48a and 48b of the front panel 48 so that both of the clicks engage with two stoppers 10a and 10b provided on the frame 10. On the other hand, as shown in FIG. 2, the front panel 48 has projecting portions 60a and 60b which project downwardly on the rear surface of the front panel 48, and these two projecting portions 60a and 60b engage with holes, not illustrated, made through the frame 10. Accordingly, both of the engaging clicks 58 and the projecting portions 60 connect and fix the front panel 48 to the frame 10 in an extremely stable state. In the connection and fixture of the front panel 48 to the frame 10, a simple downward thrusting action of the front panel 48 into the frame 10 enables the clicks 58 to engage with the stoppers 10a and 10b with one touch, and both the front panel 48 and the frame 10 can be firmly fastened without using screws or any other fixing means. On the other hand, simple deflection of the elastic engaging clicks 58 on both its sides enables the front panel 48 to be disconnected from the frame 10. Accordingly, in the normal assembling stage, the front panel 48 can engage with the frame 10 in such a way that the carrier 34 placed on the slide plate 50 is positioned on the frame 10, and all these elements can be assembled at one time.

As described above the front panel 48 has a lid 62 to cover the opening through which the cartridge 100 is loaded and unloaded. As shown in the rear view in FIG. 5, in the rear surface of the front panel 48, the lid 62 is pivotally and rotatingly supported by the shafts 64a and 64b at the sleeves 48a and 48b of the front panel 48.

On the rear side of the front panel 48 provided thereon is a receiving portion 48c to pressingly fix one end of a closing spring 66 which biases the lid 62 in the closing state.

Figure 5:
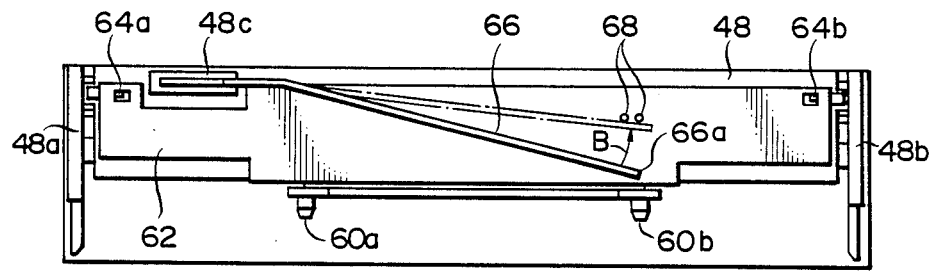
FIG. 5 is a rear view of a lid provided in the rear surface of the front panel capable of opening and closing, and its closing spring.
Figure 6:
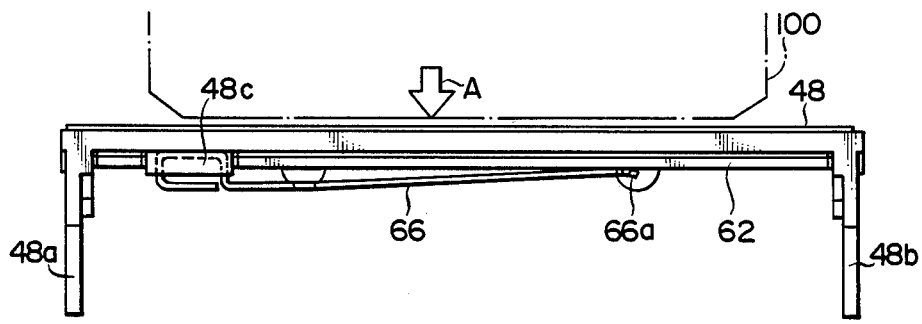
FIG. 6 is a top view showing the state immediately before the cartridge is inserted through the front panel.

FIG. 6 is a top view of FIG. 5, and it is understood that one end of the closing spring 66 is folded to form a rectangle at the receiving portion 48c. On the other hand, as shown in FIG. 5, the other end of the closing spring 66 goes across at an angle with respect to the height of the lid 62 to press and urge the lid 62 in the closed direction.

The closing spring 66 in Figure moves its actuating point 66a which is in touch with the lid 62 as the lid 62 opens or closes, and its urging force does not change much in the widest opened state of the lid 62 when compared with its regular closed state. In other words, when the cartridge 100 is inserted as shown by arrow A in FIG. 6 in the closing state of the lid 62 in FIG. 5, the lid 62 is thrust in by the cartridge 100 to rotate with the shafts 64a and 64b as the center. As the lid 62 rotates, closing spring 66 glides and moves one end of the actuating point 66a along the surface of the lid 62, and stops at the position where the spring 66 engages with the stoppers 68.

Figure 7:
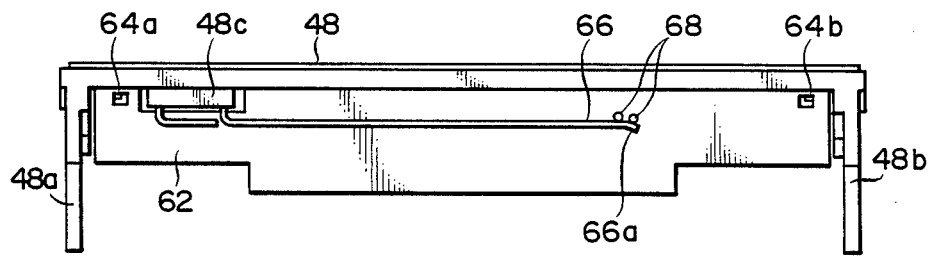
FIG. 7 is a top view showing the front panel to be put in the state that the lid of the front panel is pushed open.

In FIG. 7 shown therein is the lid 62 in the fully opened state. The closing spring 66 stops when its actuating point 66a comes in contact with the stoppers 68. Consequently, the actuating point 66a of the closing spring 66 urges the lid 62 at a point extremely close to the shafts 64a and 64b, and the stress of the spring 66 and the urging force applied to the lid 62 are kept unchanged from the initial state. Accordingly, fatigue of the spring 66 is reduced and strong pressure on the cartridge 100 can be prevented. Furthermore, the stationary yield strength in various portions of the mechanism can be kept at a sufficiently safer state since the urging force to the lid 62 is well controlled.

As described hereinabove, according to the present invention, upward and downward motion of the carrier 34 after the cartridge is inserted therein enables easy switching to the loaded and unloading positions, and the respective portions of the mechanism can be assembled with extreme ease.

Furthermore, in the embodiment, the cartridge 100 in the carrier 34 can be ejected by the urging force of the shutter lever, and, on the other hand, the shutter lever is not required to have a specific locking means in the loading state since the shutter lever can be locked by the cartridge itself.

In FIG. 2 a lock lever 70 is pivotally and rotatingly supported by a shaft 72 on the frame 10, and is urged counterclockwise by a spring 74. The locking lever 70 has a locking pin 76 and the spring 74 presses and urges the locking lever 70 to the inside of the side wall 52 of the slide plate 50. The locking lever 70 also engages with a locking groove 78 provided inside of the side wall 52. On the other hand, a contact portion 80 provided on the other end of the locking lever 70 comes in contact with front end of the cartridge 100.

A shutter lever 84 is pivotally and rotatingly provided on the upper carrier plate 36 with a shaft 82 as the center and a spring 86 always urges the lever 84 counterclockwise. Fixed on the top end of the shutter lever 84 is a shutter pin 88 which can move along in the arc opening 36a.

Figure 8:
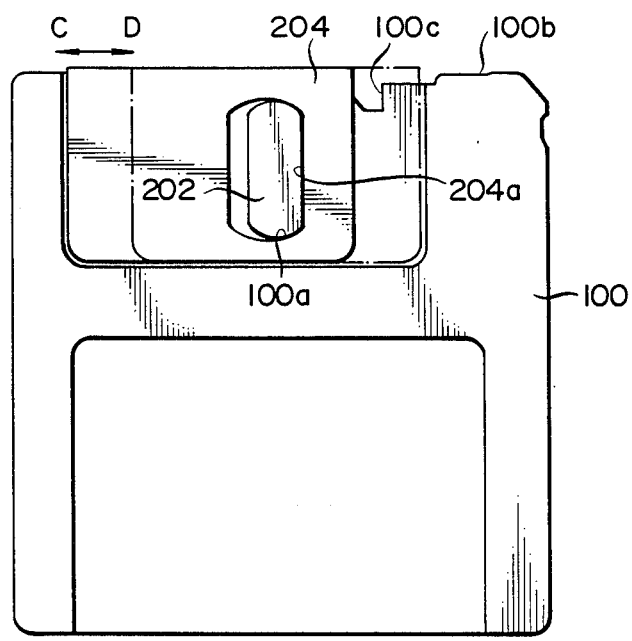
FIG. 8 is a top view of the microfloppy disk which is to be used in the present invention.

In FIG. 8 shown therein is a preferred embodiment of a microfloppy disk. A floppy disk medium 202 is rotatingly contained in the cartridge 100 which has an opening 100a to expose the medium 202. Furthermore, a shutter 204 is provided in the cartridge 100 so that it can move in the direction shown by arrows C and D. When an opening 204a of the shutter 204 agrees with the opening 100a at the place shown by a regular line, the medium 202 is exposed. On the other hand, when the shutter 204 moves to the position shown in the chained line, the medium 202 is covered.

Furthermore. the cartridge 100 has a groove 100b and a cutout 100c to prevent improper insertion of the cartridge 100.

Figure 9:
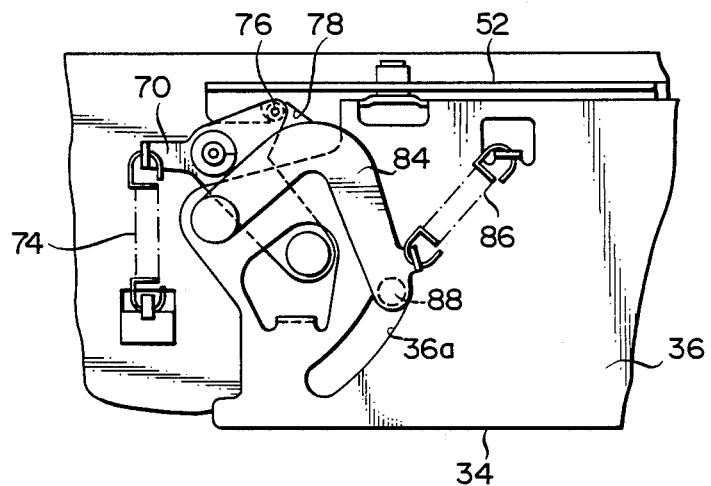
FIG. 9 is a top view showing a principal portion of the cartridge loading/unloading mechanism in such a state that the cartridge is ejected therefrom in accordance with the teachings of the present invention.

FIG. 9 shows the cartridge 100 ejected from the carrier 34. At this time the shutter lever 84 is held in such a state that the shutter pin 88 moves counterclockwise all the way to the one end position of the opening 36a, and the shutter pin 88 stays at a position engageable with the end of the shutter 204 of the cartridge 100. On the other hand, the locking pin 76 of the locking lever 70 engages with the locking groove 78 provided on the side wall 52 of the slide plate 50, and the spring 74 holds this engaging state.

Accordingly, FIG. 9 shows the condition when the slide plate 50 moves to the most left position, and that the carrier 34 moves upward to be able to receive the cartridge 100, as is shown in FIG. 3.

Figure 10:
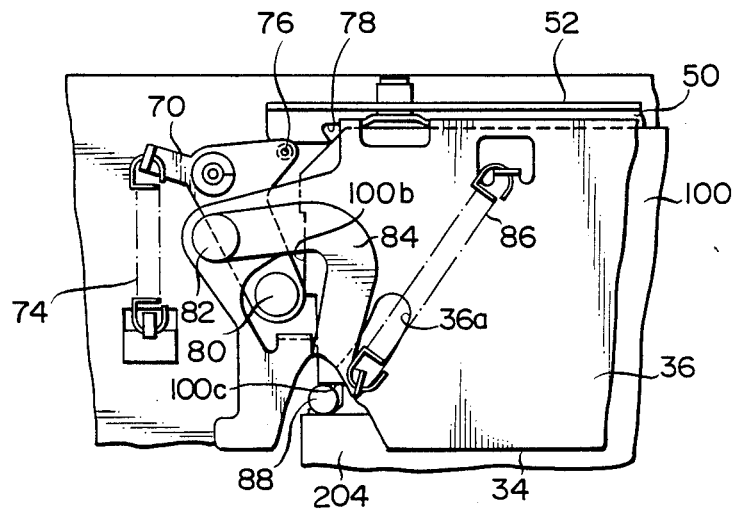
FIG. 10 is a top view showing the state that a shutter lever is locked in such a state that the cartridge in the loaded position.

In the state shown in FIG. 9, when the cartridge 100 is inserted in the carrier 34, as shown in FIG. 10, the end contact surface 100b of the cartridge 100 rotates the contact portion 80 of the locking lever 70 clockwise at the final stage of insertion so that the engagement between the locking pin 76 and the locking groove 78 is released to have the slide plate 50 move to the right by an urging means, not illustrated. Consequently, the slide plate 50 can move the carrier 34 downward to the correct loaded position by the guide slots 54a and 54b, as shown in FIG. 1.

Before its movement to the loaded state, the shutter 204 of the cartridge 100 is opened by the shutter lever 84. In other words, the shutter pin 88 engages with the right end of the shutter 204 when the cartridge 100 is inserted, as is shown in FIG. 8, and the shutter opens to expose the medium as the cartrige 100 is inserted.

The embodiment is characterized in that the shutter pin 88 falls along the shutter 204 and into the cutout 100c of the cartridge 100. Thus, the cartridge 100 can be firmly held by the returning force of the shutter 204 and the cutout 100c with the pin 88 fallen through. Consequently, as the urging force of the spring 86 is prevented from ejecting the cartridge 100, the shutter lever 84 can lock the cartridge ejection force itself due to the falling action of the shutter pin 88.

Therefore, the cartridge does not receive any unnecessary urging force when the carrier moves downward or returns upward, and can be smoothy run, after the cartridge is firmly locked as described above.

When the cartridge is taken out of the loaded state shown in FIG. 1, a cartridge ejection button 51 is pushed in the direction shown by the arrow E to have the slide plate 50 which is linked to this button 51 move to the left in FIG. 10, and the locking pin 76 of the locking lever 70 falls into the locking groove 78. At this time the initial rotation of the locking lever 70 pushes the contact portion 80 of the cartridge 100 slightly to the right, and the shutter pin 88 of the shutter lever 84 disengages from the cutout 100c to have the cartridge ejecting force again be effective from the spring 86. As a result, the cartridge 100 can be ejected from the carrier 34.

The cartridge ejecting action mentioned above is performed at the position that the carrier moves upward by the left direction movement if the slide plate 50, as is shown in FIG. 3, and the shutter 204 covers the medium 202 when the slide plate 50 returns to the right. Therefore, it is understood that the shutter lever 84 combines the actions of opening and closing the shutter 204 and ejecting the cartridge 100.

Figure 11:
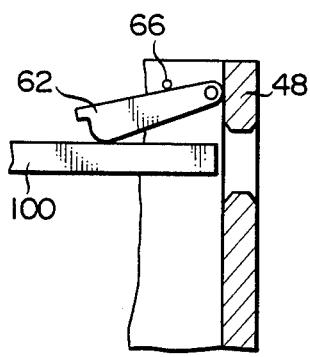
FIG. 11 is an illustration describing the braking action by the lid in the ejection of the cartridge.

In the cartridge ejection described above, as shown in FIG. 11, the cartridge 100 can be provided with the requested friction force by the closing spring 66 of the lid 62 as is shown in FIGS. 5 through 7. Accordingly, the cartridge 100 is prevented from popping out of the mechanism and it becomes possible for the cartridge 100 to be always ejected to a stable position at a slow speed.

In this embodiment, the shutter lever 84 is further used to prevent the cartridge 100 from being inserted incorrectly. As is evident from FIG. 9, the arc opening 36a of the upper carrier plate 36, which the shutter pin 88 of the shutter 84 penetrates, is closed on its top end (the left end) so that the shutter pin 88 is regulated and cannot move beyond the arc opening 36a.

Figure 12:
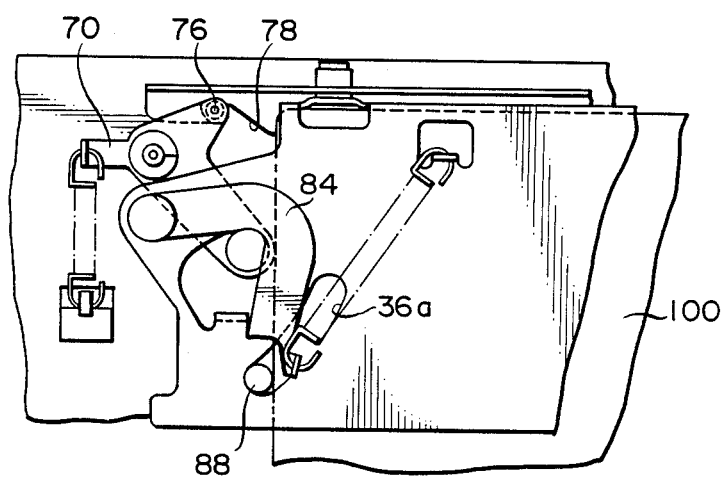
FIG. 12 is an illustration describing the loading protection from a wrong cartridge insertion.

FIG. 12 shows the state wherein the cartridge 100 is inserted in the wrong direction. In this case of incorrect insertion of the shutter pin 88 of the shutter lever 84 moves earlier or longer than in the case of correct insertion. In other words, as evident from FIG. 8, the shutter pin 88 engages with the indented contact portion 100b of the cartridge 100 or the deeper contact portion in correct insertion, but in incorrect or improper insertion the shutter pin 88 reaches the top end of the arc opening 36a much earlier than the correctly inserted case, since an indented contact portion does not exist on the shutter pin 88, and the cartridge 100 does not go farther than the state shown in FIG. 12.

In this state, since the locking pin 76 of the locking lever 70 engages with the locking groove 78, and the slide plate cannot move, the cartridge 100 cannot veer to the loaded position, and incorrect insertion can be easily recognized.

As described heretofore, according to the present invention, the front panel which is used only as a covering plate having an opening through which the cartridge is only loaded and unloaded in the prior art, can be utilized as the guides to move the carrier up and down without using any other specific supporting elements, and the mechanism can be assembled and dismantled with extreme ease since the front panel can be attached by elastic engaging clicks provided on both sleeves of the front panel.

What is claimed is:

1. A cartridge loading mechanism for a microfloppy disk drive comprising:
   a frame;
   a carrier for loading and unloading a floppy disk cartridge, said carrier supported to be movable upwardly and downwardly within said frame;
   a front panel for supporting said carrier movable upwardly and downwardly between loading and unloading positions;
   sleeve portions provided on said front panel;
   a pair of guide slits with openings at one end thereof provided in said sleeve portions, said guide slits supporting said upward and downward motion of said carrier;
   a pair of elastic engaging clicks provided on each of said sleeve portions; and
   a pair of stoppers provided on said frame for engaging with said engaging clicks of said front panel.

* * * * *